United States Patent
Popovic et al.

(10) Patent No.: US 12,547,235 B2
(45) Date of Patent: Feb. 10, 2026

(54) DYNAMIC VECTOR LANE BROADCASTING

(71) Applicants: Advanced Micro Devices, Inc., Santa Clara, CA (US); ATI Technologies ULC, Markham (CA)

(72) Inventors: Josip Popovic, Markham (CA); Anshuman Mittal, Santa Clara, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 8 days.

(21) Appl. No.: 17/932,155

(22) Filed: Sep. 14, 2022

(65) Prior Publication Data

US 2024/0085970 A1    Mar. 14, 2024

(51) Int. Cl.
*G06F 1/32* (2019.01)
*G06F 1/3237* (2019.01)
*G06F 9/48* (2006.01)

(52) U.S. Cl.
CPC .......... *G06F 1/3237* (2013.01); *G06F 9/4843* (2013.01)

(58) Field of Classification Search
CPC .................................................... G06F 9/4843
See application file for complete search history.

(56) References Cited

U.S. PATENT DOCUMENTS

| | | | |
|---|---|---|---|
| 5,130,786 A | 7/1992 | Murata et al. | |
| 8,413,151 B1* | 4/2013 | Stratton | G06F 9/4843 712/22 |
| 8,837,006 B2 | 9/2014 | McDowell et al. | |
| 9,817,466 B2* | 11/2017 | Sideris | G06F 9/3869 |
| 10,244,245 B2 | 3/2019 | Rusanovskyy et al. | |
| 2009/0226084 A1 | 9/2009 | Courchesne et al. | |
| 2010/0295852 A1* | 11/2010 | Yang | G06F 1/3228 345/212 |
| 2010/0312988 A1* | 12/2010 | Bjorklund | G06F 9/30072 712/7 |

(Continued)

FOREIGN PATENT DOCUMENTS

WO    9960793 A1    11/1999

OTHER PUBLICATIONS

Chan et al., U.S. Appl. No. 17/562,777, entitled "Color Channel Correlation Detection", filed Dec. 27, 2021, 32 pages.

*Primary Examiner* — Jaweed A Abbaszadeh
*Assistant Examiner* — Cheri L Harrington
(74) *Attorney, Agent, or Firm* — Kowert, Hood, Munyon, Rankin & Goetzel, P.C.; Rory D. Rankin

(57) ABSTRACT

An apparatus and method for efficient power management of multiple integrated circuits. In various implementations, a computing system includes first partition and a second partition. The second partition includes video pre-processing circuitry that identifies regions of a video frame to be presented on a screen or monitor that don't change or regions that can have one or more of resolution and color accuracy be below a threshold. The first partition includes a parallel data processor with one or more compute units, each with multiple lanes of execution. Based on the identified regions, the first partition generates an execution mask indicating which lanes of the compute units are inactive. The parallel data processor copies result data from the active lanes to outputs of the inactive lanes.

20 Claims, 8 Drawing Sheets

(56) References Cited

U.S. PATENT DOCUMENTS

| | | | |
|---|---|---|---|
| 2011/0047349 A1* | 2/2011 | Hayashi | G06F 9/5011 |
| | | | 712/22 |
| 2012/0013627 A1* | 1/2012 | Shah | G06F 1/3203 |
| | | | 345/522 |
| 2012/0206461 A1* | 8/2012 | Wyatt | G06F 1/3218 |
| | | | 345/501 |
| 2014/0149775 A1* | 5/2014 | Ware | G06F 1/3278 |
| | | | 713/323 |
| 2015/0092855 A1* | 4/2015 | Chou | H04N 19/147 |
| | | | 375/240.16 |
| 2015/0227540 A1 | 8/2015 | Lin et al. | |
| 2015/0301826 A1* | 10/2015 | Sideris | G06F 1/329 |
| | | | 712/226 |
| 2016/0124905 A1* | 5/2016 | Lutz | G06F 9/3001 |
| | | | 708/190 |
| 2017/0168546 A1* | 6/2017 | Meswani | G06F 9/3836 |
| 2018/0113709 A1* | 4/2018 | He | G06F 9/3887 |
| 2018/0307971 A1* | 10/2018 | Sinha | G06N 3/04 |
| 2019/0042269 A1* | 2/2019 | Pearce | G06F 9/3888 |
| 2019/0187775 A1* | 6/2019 | Rotem | G06F 1/324 |
| 2019/0384613 A1* | 12/2019 | Petit | G06F 9/30181 |
| 2019/0385247 A1* | 12/2019 | Raghunathan | G06F 1/1686 |
| 2020/0073662 A1* | 3/2020 | Rasale | G06F 9/30043 |
| 2020/0233726 A1* | 7/2020 | Dejanovic | G06F 9/3828 |
| 2020/0234501 A1* | 7/2020 | Rodriguez | G06F 1/3265 |
| 2021/0349717 A1* | 11/2021 | Gurram | G06F 9/38885 |
| 2023/0042858 A1* | 2/2023 | Singh | G06F 9/4843 |

\* cited by examiner

DYNAMIC VECTOR LANE BROADCASTING

BACKGROUND

Description of the Relevant Art

A variety of computing devices utilize heterogeneous integration, which integrates multiple types of integrated circuits (ICs) for providing system functionality. The multiple functions include audio/video (A/V) data processing, other high data parallel applications for the medicine and business fields, processing instructions of a general-purpose instruction set architecture (ISA), digital, analog, mixed-signal and radio-frequency (RF) functions, and so forth. A variety of choices exist for system packaging to integrate the multiple types of ICs. In some computing devices, a system-on-a-chip (SOC) is used, whereas, in other computing devices, smaller and higher-yielding chips are packaged as large chips in multi-chip modules (MCMs). In yet other computing devices, three-dimensional integrated circuits (3D ICs) that utilize die-stacking technology as well as silicon interposers to vertically stack two or more semiconductor dies in a system-in-package (SiP).

Regardless of the choice for the system packaging, the power consumption of modern ICs has become an increasing design issue with each generation of semiconductor chips. As power consumption increases, more costly cooling systems such as larger fans and heat sinks must be utilized in order to remove excess heat and prevent IC failure. However, cooling systems increase system costs. The IC power dissipation constraint is not only an issue for portable computers and mobile communication devices, but also for desktop computers and servers utilizing high-performance microprocessors.

In view of the above, methods and systems for performing efficient power management of multiple integrated circuits are desired.

Figure 1:
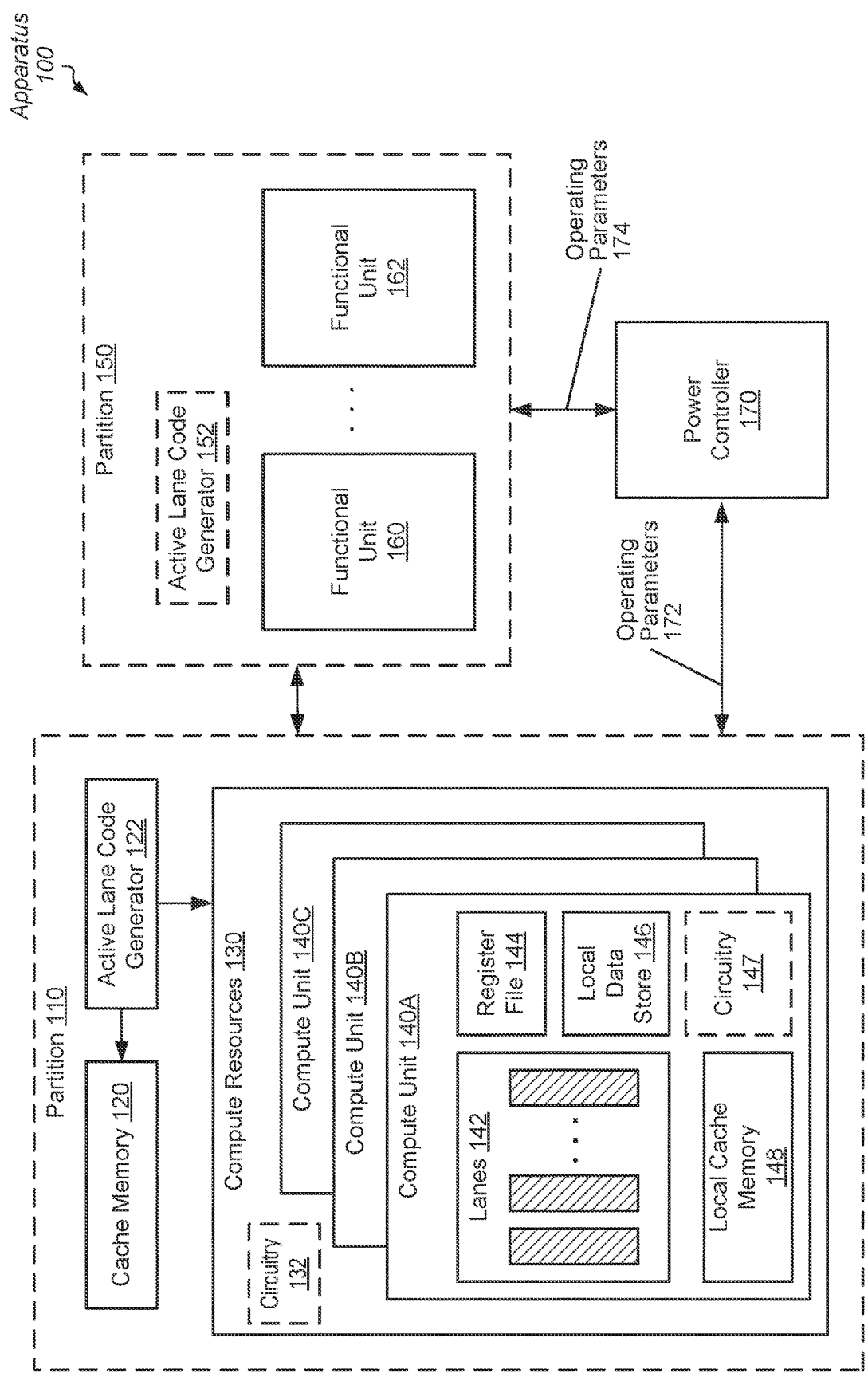
FIG. 1 is a generalized block diagram of an apparatus that efficiently manages power consumption of multiple integrated circuits.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods performing efficient power management of multiple integrated circuits are contemplated. In various implementations, a computing system includes a power controller that assigns a first power domain to a first partition and a second power domain to a second partition. Each of the power domains assigned by the power controller includes at least operating parameters such as at least an operating power supply voltage and an operating clock frequency. Each of the power domains also includes control signals for enabling and disabling connections to clock generating circuitry and a power supply reference. In some implementations, the first partition includes one of a variety of types of a parallel data processor that uses one or more processor cores, each with a relatively wide single instruction multiple data (SIMD) micro-architecture to achieve high throughput in highly data-parallel applications. In some implementations, each of the one or more processor cores includes one or more compute units, each with multiple lanes of execution. In some implementations, the second partition includes one or more functional units different from the compute unit. In an implementation, the second partition includes video processing functional units such as one or more of an analog-to-digital converter (ADC), a scan converter, a video decoder, a display controller, and so on. In such implementations, the parallel data processor of the first partition is a graphics processing unit (GPU).

The second partition processes tasks using operational states corresponding to the second power domain. In some implementations, a background of a desktop can be a continuous blue color (or other color) that doesn't change. Therefore, each macroblock corresponding to a video frame of the background provides the same pixel information as its neighboring macroblock that corresponds to the background. Additionally, one or more of a video graphics application or video pre-processing circuitry of the second partition determines which regions (which macroblocks) of a screen or monitor correspond to regions of resolution or color accuracy below a threshold. This information is passed to the parallel data processor of the first partition. Based on this received information, the parallel data processor selects which lanes of the multiple lanes of a compute unit can be inactive while processing tasks.

In various implementations, the parallel data processor of the first partition generates an execution mask indicating which lanes of the one or more compute units are active for processing tasks based on the operating parameters of the first power domain. In some implementations, the execution mask is a bit mask where a bit position of each asserted bit indicates a lane of the compute unit that is active, and a bit position of each negated bit indicates a lane of the compute unit that is inactive. In other implementations, asserted bits indicate inactive lanes and negated bits indicate active lanes. In other implementations, the parallel data processor generates a ratio that is later decoded into a bit mask.

In some implementations, the ratio indicates a number of active lanes to a number of total lanes of each of the one or more compute units. In such an implementation, the ratio can be 3:5, or 3/5, or 60%. For this ratio and a particular compute unit, the ratio indicates that the parallel data processor selects three lanes of each contiguous group of five lanes to be active. In yet other implementations, the parallel data processor generates a broadcast code that includes a bit to indicate that at least one lane of the multiple lanes is inactive. The broadcast code also includes one or more additional bits to indicate the ratio.

In an implementation, the broadcast code includes two bits with a first bit to indicate whether at least one lane of the multiple lanes is inactive and a second bit to indicate one of two ratios to use when at least one lane of the multiple lanes is inactive. When the first bit indicates the at least one lane is inactive, a negated value of the second bit indicates a ratio of one half, such that each even numbered lane is active, and each odd numbered lane is inactive. When the first bit indicates the at least one lane is inactive, an asserted value of the second bit indicates a ratio of one fourth such that each active lane has three neighboring contiguous inactive lanes. Other ratios and number of bits are used in the broadcast code in other implementations.

The parallel data processor prevents fetching of data for the lanes selected to be inactive. The parallel data processor removes one or more of clock signals and power supply reference signals from the lanes selected to be inactive. For example, the parallel data processor performs clock gating (i.e., disabling a clock signal) of one or more clock signals used by the lanes selected to be inactive. Such clock gating may also be referred to as clock gating a lane. Additionally, the parallel data processor performs power gating of one or more power reference signals used by the lanes selected to be inactive. The parallel data processor fetches data for the active lanes. The active lanes process tasks using operational states corresponding to the first power domain assigned to the compute units of the first partition. The parallel data processor copies result data from the active lanes to outputs of the inactive lanes. In one implementation, when each even numbered lane is active and each odd numbered lane is inactive, each even numbered lane (an active lane) forwards result data to a neighboring odd numbered lane (an inactive lane). Therefore, the parallel data processor reduces power consumption by maintaining at least one or more lanes of the multiple lanes as inactive while processing tasks, and yet still providing result data from each of the multiple lanes. Further details of these techniques to reduce power consumption are provided in the following description of FIGS. 1-6.

Referring to FIG. 1, a generalized block diagram is shown of an apparatus 100 that efficiently manages power consumption of multiple integrated circuits. In the illustrated implementation, the apparatus 100 includes two partitions, such as partition 110 and partition 150, each assigned to a respective power domain. Each of the power domains includes at least operating parameters such as at least an operating power supply voltage and an operating clock frequency. Each of the power domains also includes control signals for enabling and disabling connections to clock generating circuitry and one or more power supply references. Partition 110 receives operating parameters 172 of a first power domain from power controller 170, and partition 150 receives operating parameters 174 of a second domain from power controller 170. Each of the partitions 110 and 150 includes components for processing tasks. Partition 110 includes the compute resources 130. Partition 150 includes the functional units 160-162.

A communication fabric, a memory controller, interrupt controllers, and phased locked loops (PLLs) or other clock generating circuitry are not shown for ease of illustration. In some implementations, the functionality of the apparatus 100 is included as components on a single die such as a single integrated circuit. In an implementation, the functionality of the apparatus 100 is included as one die of multiple dies on a system-on-a-chip (SOC). In various implementations, the apparatus 100 is used in a desktop, a portable computer, a mobile device, a server, a peripheral device, or other.

In various implementations, the apparatus 100 uses a parallel data micro-architecture that provides high instruction throughput for a computationally intensive task. In one implementation, the apparatus 100 uses one or more processor cores with a relatively wide single instruction multiple data (SIMD) micro-architecture to achieve high throughput in highly data-parallel applications. These applications use parallelized tasks for at least video graphics, scientific and engineering fields, medical field, and business (finance) field. In some cases, these applications perform the steps of neural network training and inference. The tasks include subroutines (function calls) of instructions to execute. A work-item is a same instruction of the subroutine to execute with different data items. A particular combination of the same instruction and a particular data item of the multiple data items is referred to as a "work item." A work item is also referred to as a software thread. A number of work items are grouped into a wave front for simultaneous execution by multiple SIMD execution lanes such as the lanes 142 of the compute units 140A-140C. Each data item is processed independently of other data items, but the same sequence of operations of the subroutine is used. In one implementation, the apparatus 100 is a graphics processing unit (GPU). Modern GPUs are efficient for data parallel computing found within loops of applications, such as in applications for manipulating, rendering, and displaying computer graphics. In such cases, each of the data items of a wave front is a pixel of an image. The applications can also include molecular dynamics simulations, finance computations, neural network training, and so forth. The highly parallel structure of GPUs makes them more effective than general-purpose central processing units (CPUs) for a range of complex algorithms.

The apparatus 100 uses the circuitry of compute resources 130 of partition 110 to process tasks such as highly data parallel applications. The compute resources 130 includes the multiple compute units 140A-140C, each with multiple lanes 142. As described earlier, each lane is also referred to as a single instruction multiple data (SIMD) unit or a SIMD lane. In some implementations, the lanes 142 operate in lockstep. In various implementations, the data flow within each of the lanes 142 is pipelined. Pipeline registers are used for storing intermediate results and circuitry for arithmetic logic units (ALUs) perform integer arithmetic, floating-point arithmetic, Boolean logic operations, branch condition comparisons and so forth. These components are not shown for ease of illustration. Each of the computation units within a given row across the lanes 142 is the same computation unit. Each of these computation units operates on a same instruction, but different data associated with a different thread.

As shown, each of the compute units 140A-140C also includes a respective register file 144, a local data store 146, circuitry 147 and a local cache memory 148. In some implementations, the local data store 146 is shared among the lanes 142 within each of the compute units 140A-140C. In other implementations, a local data store is shared among the compute units 140A-140C. Therefore, it is possible for one or more of lanes 142 within the compute unit 140A to share result data with one or more lanes 142 within the compute unit 140A based on an operating mode. Although an example of a single instruction multiple data (SIMD) micro-architecture is shown for the compute resources 130, other types of highly parallel data micro-architectures are possible and contemplated. The high parallelism offered by the hardware of the compute resources 130 is used for simultaneously rendering multiple pixels, but it is also capable of simultaneously processing the multiple data elements of the scientific, medical, finance, encryption/decryption, and other computations.

The functional units 160-162 include one or more of an analog-to-digital converter (ADC), a scan converter, a video decoder, a display controller, and other functional units. In some implementations, the partition 110 is used for real-time data processing, whereas the partition 150 is used for non-real-time data processing. Examples of the real-time data processing are rendering multiple pixels, image blending, pixel shading, vertex shading, and geometry shading. Examples of the non-real-time data processing are multimedia playback, such as a video decoding for encoded audio/video streams, image scaling, image rotating, color space conversion, power up initialization, background processes such as garbage collection, and so forth. Circuitry of a controller (not shown) receives tasks. In some implementations, the controller is a command processor of a GPU, and the task is a sequence of commands (instructions) of a function call of an application. The controller assigns a task to one of the two partitions 110 and 150 based on a task type of the received task.

In some implementations, the power controller 170 is an integrated controller as shown, whereas, in other implementations, the power controller 170 is an external unit. In one implementation, power controller 170 collects data from components of the apparatus 100. In some implementations, the collected data includes predetermined sampled signals. The switching of the sampled signals indicates an amount of switched capacitance. Examples of the selected signals to sample include clock enable signals, bus driver enable signals, mismatches in content-addressable memories (CAM), CAM word-line (WL) drivers, and so forth. In an implementation, power controller 170 collects data to characterize power consumption in apparatus 100 during given sample intervals.

In some implementations, on-die current sensors and temperature sensors in apparatus 100 also send information to power controller 170. Power controller 170 uses one or more of the sensor information, a count of issued instructions or issued threads, and a summation of weighted sampled signals to estimate power consumption for the apparatus 100. Power controller 170 decreases (or increases) power consumption if apparatus 100 is operating above (below) a threshold limit. In some implementations, power controller 170 selects a respective power management state for each of the partitions 110 and 150. As used herein, a "power management state" is one of multiple "P-states," or one of multiple power-performance states that include operational parameters such as an operational clock frequency and an operational power supply voltage.

In various implementations, the power controller 170 also disables and later re-enables functional units such as disabling and later re-enabling connections to a power supply voltage or a clock generating source. Therefore, the power controller 170 is capable of sending control signals to components of apparatus 100 to remove connection from at least one transitioning clock signal and a connection from at least one power supply reference. The power controller 170 is further capable of sending control signals to components of apparatus 100 to reestablish connection to the transitioning clock signal and a connection to the power supply reference.

In some implementations, one or more of the functional units 160-162 detects that a background of a desktop is a continuous blue color (or other color) that doesn't change. Therefore, each macroblock of a video frame corresponding to the background to be presented on a screen provides the same pixel information as its neighboring macroblock. Additionally, one or more of a video graphics application or one of the functional units 160-162 determines which regions (which macroblocks) of a screen or monitor correspond to regions of resolution or color accuracy below a threshold. In an implementation, the active lane code generator 152 (or code generator 152) generates first execution code indicating which pixels to process based on this region information and which pixels to skip processing based on this region information. Although pixel processing is described here, in other implementations, another type of data processing is being performed by the apparatus 100. In such implementations, the code generator 152 generates the first execution code (or first code) indicating which data items to process based on this region information and which data items to skip processing based on this region information.

In an implementation, the hardware, such as circuitry, of the code generator 152 generates the first code as a bit mask where a bit position of each asserted bit indicates a lane of the compute unit that is active. A bit position of each negated bit of the bit mask indicates a lane of the compute unit that is inactive. In other implementations, asserted bits indicate inactive lanes and negated bits indicate active lanes. Rather than indicate each pixel (or other type of data item) can be processed, the code generator 152 specifies how many lanes can be inactive such as one or more lanes 142 of the compute units 140A-140C.

In other implementations, the code generator 152 generates the first code as a ratio that is later decoded into a bit mask. In some implementations, the ratio indicates a number of active lanes to a number of total lanes of each of the one or more compute units 140A-140C. In such an implementation, the ratio can be 3:5, or 3/5, or 60%. For this ratio and a particular compute unit of the compute units 140A-140C, the ratio indicates that three lanes of each contiguous group of five lanes of lanes 142 are active, whereas two lanes of a contiguous group of five lanes of lanes 142 are inactive. Other values of the ratio are possible and contemplated. The code generator 152 sends the first code to the partition 110.

In yet other implementations, the code generator 152 generates the first code as a broadcast code that includes a bit to indicate that at least one lane of the lanes 142 is inactive. The broadcast code also includes one or more additional bits to indicate the ratio. In an implementation, the broadcast code includes two bits with a first bit to indicate at least one lane of the lanes 142 is inactive and a second bit to indicate one of two ratios to use when at least one lane of the multiple lanes is inactive. When the first bit indicates the at least one lane is inactive, a negated value of the second bit indicates a ratio of one half such that each even numbered lane of lanes 142 is active and each odd numbered lane of lanes 142 is inactive. When the first bit indicates the at least one lane is inactive, an asserted value of the second bit indicates a ratio of one fourth such that each active lane of lane 142 has three neighboring contiguous inactive lanes of lanes 142. For example, lane 0 is active, lanes 1-3 are inactive, lane 4 is active, lanes 5-7 are inactive, and so on. Other ratios, other lane assignments, and other number of bits are used in other implementations. In some implementations, the active lane code generator 122 of the partition 110 generates a code based on a code from the code generator 152 and an indication from the power controller 170. In yet other implementations, the partition 150 does not include the code generator 152, and the active lane code generator 122 of the partition 110 generates a code based on only an indication from the power controller 170.

The hardware, such as circuitry, of the active lane code generator 122 (or code generator 122) generates a second execution code indicating which lanes of the lanes 142 are active and which lanes of the lanes 142 are inactive. Similar to the first execution code, the code generator 122 generates the second execution code as a bit mask, a ratio, a broadcast code, or other. In various implementations, the second execution code (or second code) generated by the code generator 122 (or mask generator 122) identifies which pixels to process of a particular subdivision of the video frame. In other implementations, the second code identifies which other types of data items besides pixel values to process of a particular subdivision of another dataset besides a video frame. In an implementation, the first code from the code generator 152 indicates that two pixels of each four (2×2) grouped pixels are to be assigned to active lanes. However, the code generator 122 also considers information from the power controller 170.

In an example, an indication from the power controller 170 specifies that half of these pixels are to be assigned to active lanes. In this example, the code generator 122 generates the second code to specify that one half of the pixels specified by the first code can be assigned to active lanes. Therefore, in this example, the code generator 122 generates the second code to specify that (1/2×2/4) pixels of each four (2×2) grouped pixels can be assigned to active lanes. In this example, the second code specifies that one pixel of each four (2×2) grouped pixels can be assigned to active lanes. The code generator 122 can generate a bit mask, a ratio, a broadcast code, or another representation that identifies which lanes of lanes 142 are active and which lanes of lanes 142 are inactive. The indication from the power controller 170 can be an indication of a power domain, an indication of an operating mode such as a battery saving mode, or other.

The code generator 122 sends the second code to each of the cache memory 120 and the compute resources 130. In some implementations, a cache controller of one or more of the local cache memory 148 and the cache memory 120 prevents fetching of data for the lanes of lanes 142 selected to be inactive. In some implementations, the compute resources 130 includes the circuitry 132 that receives the second code from the code generator 122 and removes one or more of clock signals and power supply reference signals from the lanes of lanes 142 selected to be inactive. In some implementations, the circuitry 132 of the compute resources 130 performs clock gating of one or more clock signals used by the lanes of lanes 142 selected to be inactive. Additionally, the circuitry 132 of the compute resources 130 performs power gating of one or more power reference signals used by the lanes of lanes 142 selected to be inactive. In other implementations, each of the compute units 140A-140C includes the circuitry 147 that receives the second code from the code generator 122 and removes one or more of clock signals and power supply reference signals from the lanes of lanes 142 selected to be inactive.

The circuitry of the compute units 140A-140C sends an indication to the cache controllers of one or more of the local cache memory 148 and the cache memory 120 that specifies that a copy of data for the active lanes of lanes 142 should be provided. The compute units 140A-140C sends an indication to one or more of the local cache memory 148 and the cache memory 120 that specifies no copy of data for the inactive lanes of lanes 142 should be provided. For example, the cache controllers of one or more of the local cache memory 148 and the cache memory 120 retrieve data items of a wave front for only the active lanes, and send these retrieved data items to the compute units 140A-140C. The active lanes process tasks using the retrieved data items and using the operational parameters 172 assigned to the compute units 140A-140C. The circuitry of the compute units 140A-140C copies result data from the active lanes to outputs of the inactive lanes of lanes 142. In an implementation, when each even numbered lane is active and each odd numbered lane is inactive, each even numbered lane (an active lane) forwards result data to a neighboring odd numbered lane (an inactive lane). Therefore, the compute resources 130 reduce power consumption by maintaining at least one or more lanes of the lanes 142 as inactive while processing tasks, and yet still providing result data from each of the multiple lanes of the lanes 142.

Figure 2:
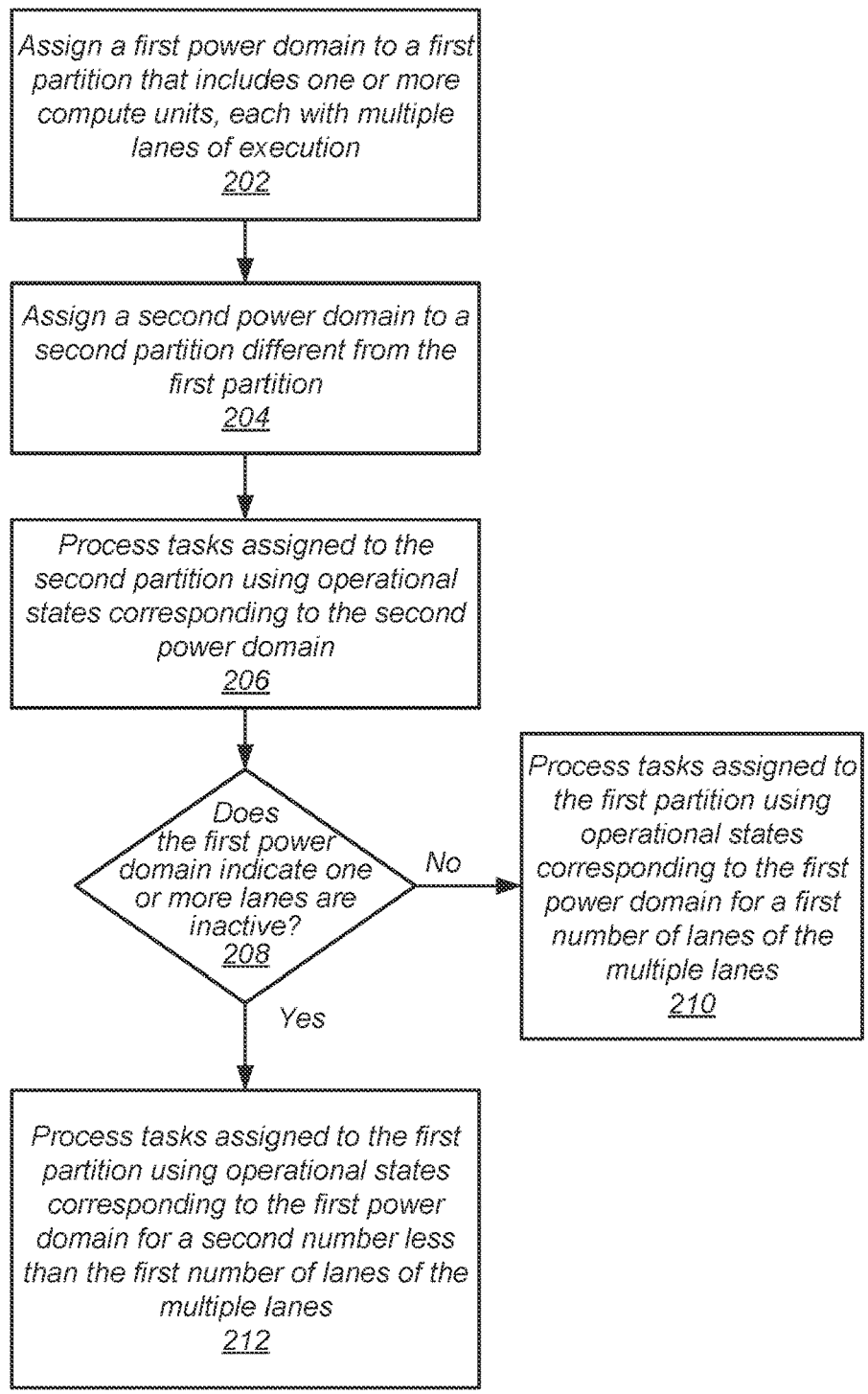
FIG. 2 is a generalized block diagram of a method for efficiently managing power consumption of multiple integrated circuits.

Referring now to FIG. 2, a generalized block diagram is shown of a method 200 for efficiently managing power consumption of multiple integrated circuits. For purposes of discussion, the steps in this implementation (as well as in FIGS. 3 and 5) are shown in sequential order. However, in other implementations some steps occur in a different order than shown, some steps are performed concurrently, some steps are combined with other steps, and some steps are absent. Method 200 (as well as methods 300 and 500) described below are used for power management of multiple integrated circuits. Any of the described apparatuses, processing units, and systems can be used to implement the steps of method 200 (as well as methods 300 and 500). A further description of these steps is provided in the below discussion.

A power controller assigns a first power domain to a first partition that includes one or more compute units, each with multiple lanes of execution (block 202). The power controller assigns a second power domain to a second partition that includes one or more functional units different from the compute unit (block 204). Each of the power domains assigned by the power controller includes at least operating parameters such as at least an operating power supply voltage and an operating clock frequency. Each of the power domains also includes control signals for enabling and disabling connections to clock generating circuitry and a power supply reference. In some implementations, the first partition includes one of a variety of types of a parallel data processor, and the second partition includes a general-purpose processor with one or more general-purpose processor cores that execute instructions of a general-purpose instruction set architecture (ISA). In other implementations, the second partition includes video processing functional units such as one or more of an analog-to-digital converter (ADC), a scan converter, a video decoder, a display controller, and so on. In such implementations, the parallel data processor of the first partition is a graphics processing unit (GPU).

The second partition processes tasks using operational states corresponding to the second power domain (block 206). If the first power domain does not indicate one or more lanes are inactive ("no" branch of the conditional block 208), then the first partition processes tasks assigned to it using operational states corresponding to the first power domain for a first number of lanes of the multiple lanes (block 210). Each of the one or more compute units processes the tasks using the first number of lanes such as each of the multiple lanes of a compute unit. If the first power domain indicates one or more lanes are inactive ("yes" branch of the conditional block 208), then the first partition processes tasks assigned to it using operational states corresponding to the first power domain for a second number less than the first number of lanes of the multiple lanes (block 212). Therefore, the first partition reduces power consumption by maintaining at least one or more lanes of the multiple lanes as inactive while processing tasks. In some implementations, the power controller sends the first power domain as a power domain that indicates one or more lanes are inactive when the power controller detects that the computing system is in a battery saving mode. In other implementations, the power controller sends a control signal separate from the indication of the first power domain that indicates one or more lanes are inactive. In yet other implementations, the power controller determines one or more lanes should be inactive when a measured power consumption value of the computing system has exceeded a power threshold.

Figure 3:
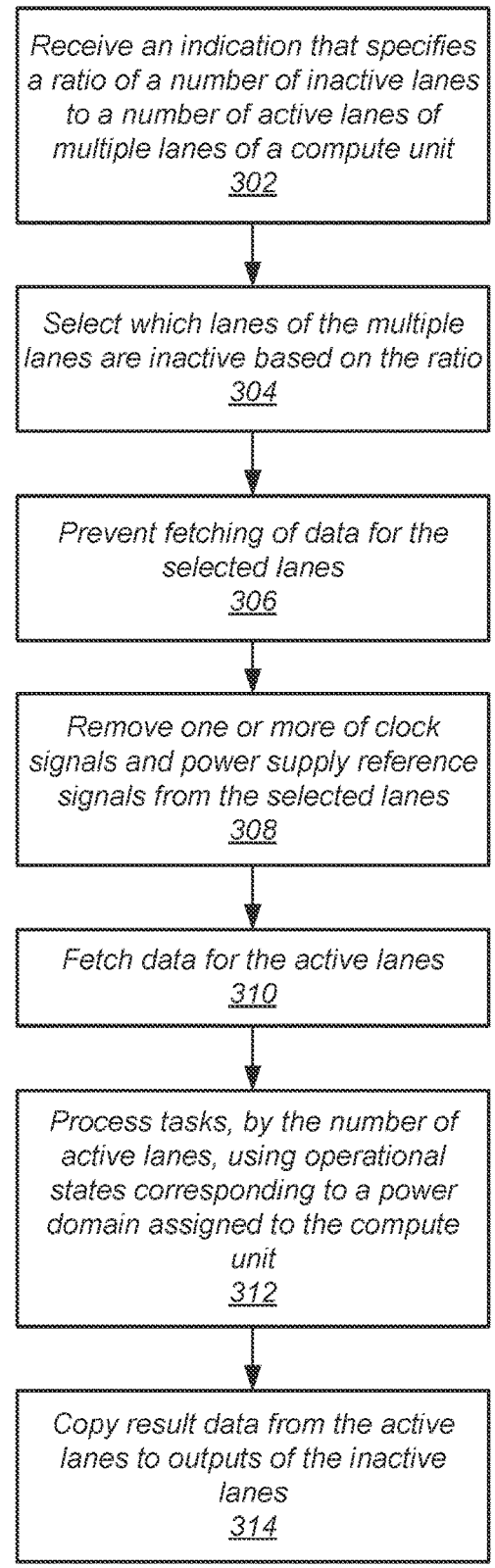
FIG. 3 is a generalized block diagram of a method for efficiently managing power consumption of multiple integrated circuits.

Referring now to FIG. 3, a generalized block diagram is shown of a method 300 for efficiently managing power consumption of multiple integrated circuits. A parallel data processor uses one or more processor cores, each with a relatively wide single instruction multiple data (SIMD) micro-architecture to achieve high throughput in highly data-parallel applications. In some implementations, the parallel data processor includes one or more compute units, each with multiple lanes of execution. The parallel data processor receives an indication that specifies a ratio of a number of inactive lanes to a number of active lanes of each of the one or more compute units (block 302). It is noted that in other implementations, the parallel data processor receives an indication that specifies one of a first ratio of a number of active lanes to a number of inactive lanes of each of the one or more compute units, a second ratio of a number of inactive lanes to a total number of lanes of each of the one or more compute units, and a third ratio of a number of active lanes to a total number of lanes of each of the one or more compute units. In some implementations, the parallel data processor receives a ratio value. In other implementations, the parallel data processor receives a bit mask that indicates one of the above ratios. In yet other implementations, the parallel data processor receives a broadcast code that includes a bit to indicate that at least one lane of the multiple lanes is inactive and also includes one or more additional bits to indicate one of the above examples of a ratio.

The parallel data processor selects which lanes of the multiple lanes are inactive based on the ratio (block 304). In an implementation, when a bit mask is not used, the parallel data processor decodes the indication and determines that the received ratio specifies a number of inactive lanes to a number of active lanes of each of the one or more compute units. In an example, this ratio is 1:3. Therefore, this received ratio specifies one inactive lane to a number of three active lanes, and 1/4, or 25% of the total number of lanes of each of the one or more compute units are inactive. For this ratio and a particular compute unit, the parallel data processor selects one lane of each contiguous group of four lanes to be inactive.

The parallel data processor prevents fetching of data for the selected lanes (block 306), which are the lanes selected to be inactive. The parallel data processor removes one or more of clock signals and power supply reference signals from the selected lanes (block 308). For example, the parallel data processor performs clock gating of one or more clock signals used by the selected lanes. Additionally, the parallel data processor performs power gating of one or more power reference signals used by the selected lanes. The parallel data processor fetches data for the active lanes (block 310). The active lanes process tasks using operational states corresponding to a power domain assigned to the compute unit (block 312). The parallel data processor copies result data from the active lanes to outputs of the inactive lanes (block 314). In an implementation, a neighboring active lane forwards its result data to an inactive lane. For example, lanes numbered 0-2 are active, the lane numbered 3 is inactive, the lanes numbered 4-6 are active, the lane numbered 7 is inactive, and so on. The active lane numbered 2 provides its result data to the output of the inactive lane numbered 3, the active lane numbered 6 provides its result data to the output of the inactive lane numbered 7, and so on. Therefore, the parallel data processor reduces power consumption by maintaining at least one or more lanes of the multiple lanes as inactive while processing tasks, and yet still providing result data from each of the multiple lanes.

Figure 4:
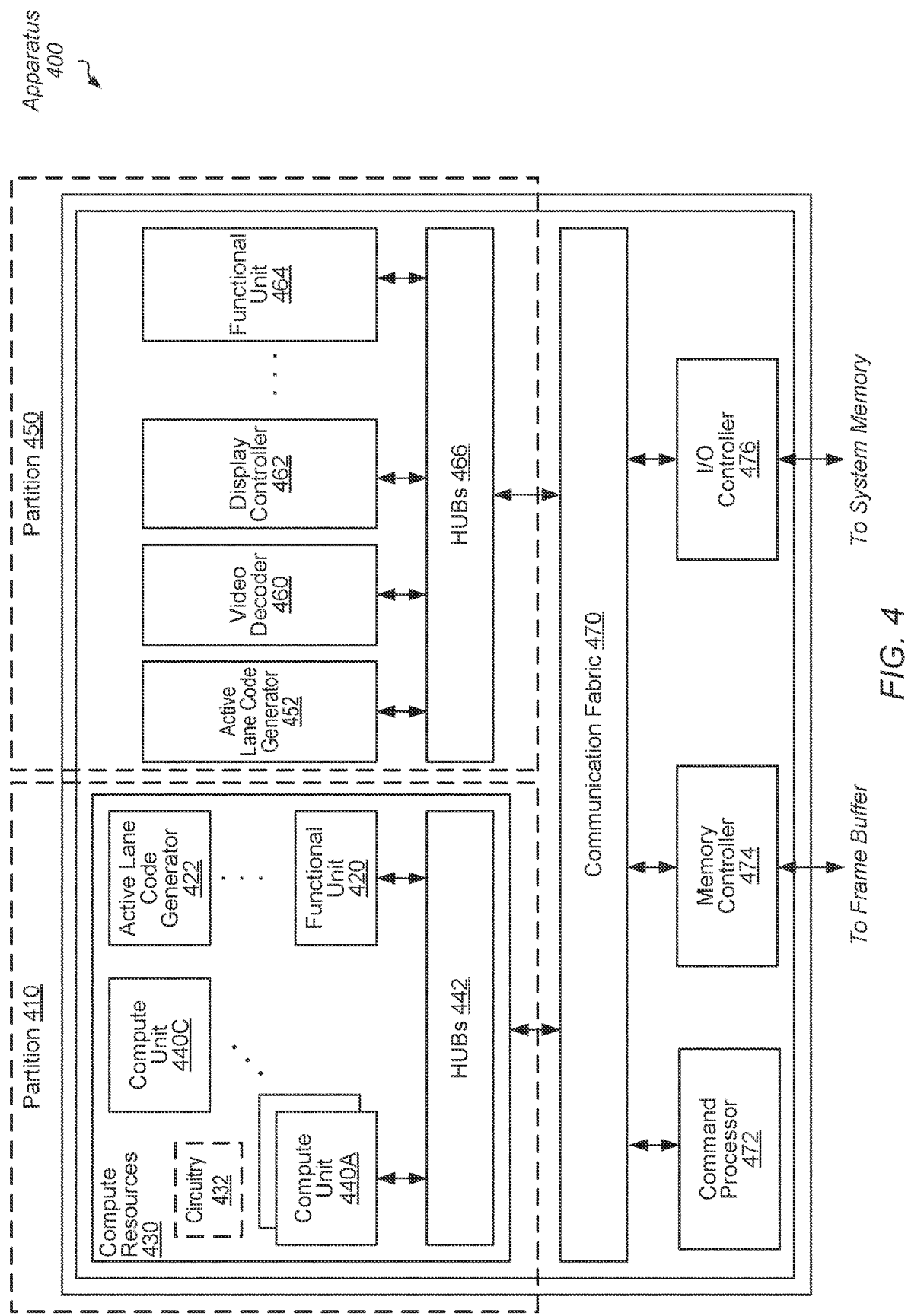
FIG. 4 is a generalized block diagram of an apparatus that efficiently manages power consumption of multiple integrated circuits.

Referring to FIG. 4, a generalized block diagram is shown of an apparatus 400 that efficiently manages power consumption. As shown, the apparatus 400 includes a communication fabric 470, a command processor 472, a memory controller 474, an input/output (I/O) controller 476, and two partitions such as partition 410 and partition 450, each assigned to a respective power domain or a same power domain. A power controller (integrated or external), a secure processor, and phase locked loops (PLLs) or other clock generating circuitry are not shown for ease of illustration. Power domains include at least operating parameters such as at least an operating power supply voltage and an operating clock frequency. Power domains also include control signals for enabling and disabling connections to clock generating circuitry and a power supply reference. In an implementation, the functionality of the apparatus 400 is included as one die of multiple dies on a system-on-a-chip (SOC). In various implementations, the apparatus 100 is used in a desktop, a portable computer, a mobile device, a server, a peripheral device, or other.

The circuitry of the active lane code generator 422 provides the same functionality as the active lane code generator 122 (of FIG. 1). Similarly, the active lane code generator 452 provides the same functionality as the active lane code generator 152 (of FIG. 1). The circuitry of the compute units 440A-440C provides the same functionality as the compute units 140A-140C (of FIG. 1). Similarly, the circuitry 432 provides the same functionality as the circuitry 132 (of FIG. 1). Partition 410 uses a data parallel micro-architecture that provides high instruction throughput for a first task type such as computationally intensive tasks. This micro-architecture uses the compute units 430A-430C to complete these tasks. Partition 410 also uses functional unit 420, which represents one of a variety of intellectual property (IP) blocks and other units that are used for transferring source data, intermediate data, and result data between the compute units 430A-430C and other circuitry such as register files, caches, and hubs 442. Examples of the tasks of the first task type assigned by the command processor 472 to partition 410 are real-time simultaneous processing of multiple data elements for scientific, medical, finance, encryption/decryption computations, and rendering multiple pixels, image blending, pixel shading, vertex shading, and geometry shading.

The partition 450 uses one or more functional units 460-464 different than any of the compute units 430A-430C used in the partition 410. For example, in some implementations, the partition 450 includes the video decoder 460, the display controller 462, and the functional unit 464, which represents one of a variety of other units. The partition 450 processes tasks of a second task type such as non-real-time tasks. Examples of tasks of the second task type assigned to the second partition are multimedia playback, such as a video decoding for encoded audio/video streams, image scaling, image rotating, color space conversion, power up initialization, background processes such as garbage collection, and so forth.

In some implementations, the circuitry of the hubs 442 and 466 support communication and interfacing with the communication fabric 470. Each of the hubs 442 and 466 includes control circuitry and storage elements for handling data transfer according to various communication protocols. The communication fabric 470 supports the transfer of memory read requests, memory write requests, memory snoop (probe) requests, token or credit messages, coherency probes, interrupts, address translation requests, and other types of messages between sources and destinations. Examples of interconnections in the communication fabric 470 are bus architectures, crossbar-based architectures, point-to-point connections, network-on-chip (NoC) communication subsystems, and so forth.

Although a single memory controller 474 and a single input/output (I/O) controller 476 is shown, in other implementations, apparatus 400 includes multiple memory controllers with each supporting one or more memory channels and multiple I/O controllers. I/O controller 476 also includes circuitry for interfacing with one of a variety of peripheral devices and external processing units. Memory controller 474 and I/O controller 476 include circuitry for grouping requests to be sent to memory such as a frame buffer or system memory, supporting data transfers with burst modes, generating and handling or reporting interrupts, storing requests and responses, and supporting one or more communication protocols. In some implementations, the system memory includes any of a variety of random-access memories (RAMs). Although not shown, memory controller 474, I/O controller 476, or another controller provides access to non-volatile memory used to store data at a lower level of the memory hierarchy than a frame buffer and system memory. Examples of the non-volatile memory are hard disk drives (HDDs), solid-state drives (SSDs), and so forth used to implement main memory.

The command processor 472 retrieves commands of a task, such as a function call, and determines the task has a task type corresponding to the partition 450 such as a non-real-time data processing task type. The command processor 472 assigns the task to the partition 450, and the partition 450 transitions to using higher performance operating parameters. In addition, any reconnections of one or more of the transitioning clock signal and power supply reference for the partition 450 are performed. The partition 410 maintains the low performance operating parameters and/or the disconnections of one or more of the transitioning clock signal and power supply reference.

When the command processor 472 assigns tasks to the partition 410, the partition 410 transitions to using higher performance operating parameters. In addition, any reconnections of one or more of the transitioning clock signal and power supply reference for the partition 410 are performed. However, it is noted that based on a code from the active lane code generator 422 (or code generator 422), the compute resources 430 prevents data fetch requests from being sent for inactive lanes to the frame buffer via the hubs 442, the communication fabric 470, and the memory controller 474. The reduced number of data fetch requests when processing the assigned task reduces the power consumption of the partition 410 for processing the assigned task.

In addition, based on the code from the code generator 422, one or more lanes of the compute units 430A-430C remain inactive, and possibly disconnected from the transitioning clock signal and power supply reference. Although less than each of the lanes of the compute units 430A-430C are used to process the assigned task, the compute resources 430 copies result data from the active lanes to outputs of the inactive lanes of the compute units 430A-430C. In an implementation, when each even numbered lane is active and each odd numbered lane is inactive, each even numbered lane (an active lane) forwards result data to a neighboring odd numbered lane (an inactive lane). Therefore, the partition 410 reduces power consumption by maintaining at least one or more lanes of the multiple lanes as inactive while processing tasks, and yet still provides result data from each of the multiple lanes.

Figure 5:
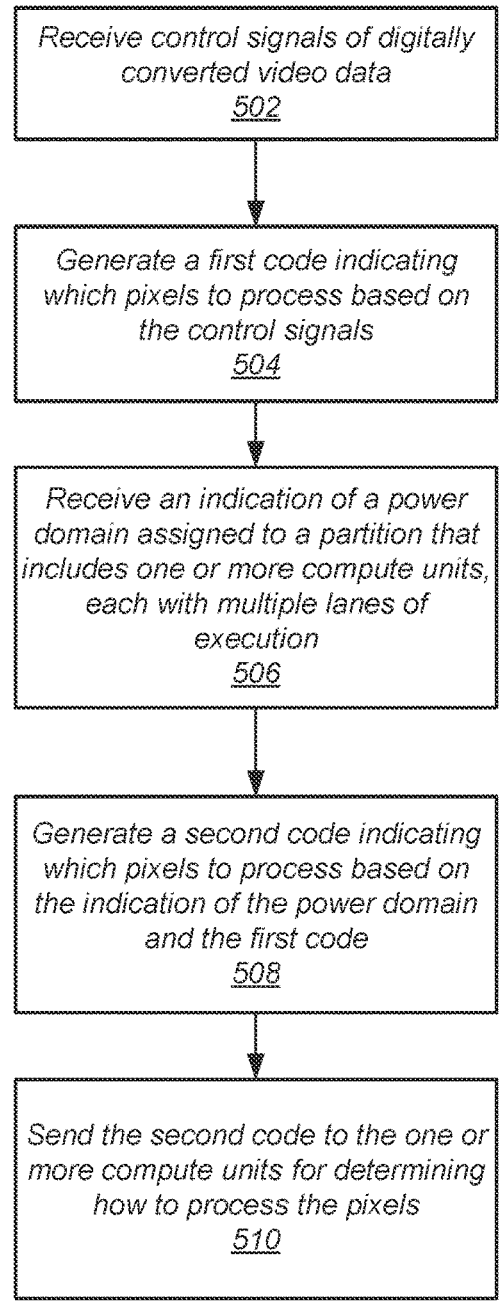
FIG. 5 is a generalized block diagram of a method for efficiently managing power consumption of multiple integrated circuits.

Referring now to FIG. 5, a generalized block diagram is shown of a method 500 for efficiently managing power consumption of multiple integrated circuits. A first partition that includes one of a variety of types of a parallel data processor, and the second partition includes one or more functional units different from the compute unit. In some implementations, the second partition includes video processing functional units such as one or more of an analog-to-digital converter (ADC), a scan converter, a video decoder, a display controller, and so on. In such implementations, the parallel data processor of the first partition is a graphics processing unit (GPU). The second partition receives control signals of digitally converted video data (block 502).

In an implementation, the scan converter of the second partition receives control signals corresponding to output data of the ADC that provides video frame data to a frame buffer. Circuitry of the second partition generates a first code indicating which pixels to process based on the control signals (block 504). The code includes a bit mask, a ratio, a broadcast code, or other. Rather than indicate each pixel can be processed, the scan converter is able to detect, from the control signals, color gradients and other information that indicate the pixels repeat. For example, a background of a desktop can be a continuous blue color (or other color) that doesn't change. Therefore, each macroblock corresponding to the background provides the same pixel information as its neighboring macroblock that corresponds to the background.

In some implementations, the scan converter or other circuitry of the second partition generates the code as a ratio that is later decoded into a bit mask. In some implementations, the ratio indicates a number of active lanes to a number of total lanes of each of the one or more compute units. In such an implementation, the ratio can be 3:5, or 3/5, or 60%. For this ratio and a particular compute unit, the ratio indicates that the parallel data processor selects three lanes of each contiguous group of five lanes to be active. Other values of the ratio are possible and contemplated. Additionally, other meanings of the ratio, as described earlier, are possible and contemplated. In yet other implementations, the scan converter or other circuitry of the second partition generates the code as a broadcast code.

The first partition receives an indication of a power domain assigned to it by a power controller (block 506). The first partition generates a second code indicating which pixels to process based on the indication of the power domain and the first code (block 508). In some implementations, the power controller sends the first power domain as a power domain that indicates one or more lanes are inactive when the power controller detects that the computing system is in a battery saving mode. In other implementations, the power controller sends a control signal separate from the indication of the first power domain that indicates one or more lanes are inactive. In yet other implementations, the power controller determines one or more lanes should be inactive when a measured power consumption value of the computing system has exceeded a power threshold.

In an implementation, the first code indicates that two pixels of each four (2×2) grouped pixels are to be assigned to active lanes. However, the indication of the power domain specifies that half of these pixels are to be assigned to active lanes. Therefore, the first partition generates the code to specify that (1/2×2/4) pixels of each four (2×2) grouped pixels can be assigned to active lanes. In other words, one pixel of each four (2×2) grouped pixels can be assigned to active lanes. The first partition sends the second code to the one or more compute units for determining how to process the pixels (block 510). The one or more compute units can perform the steps described earlier for method 300 (of FIG. 3).

Figure 6:
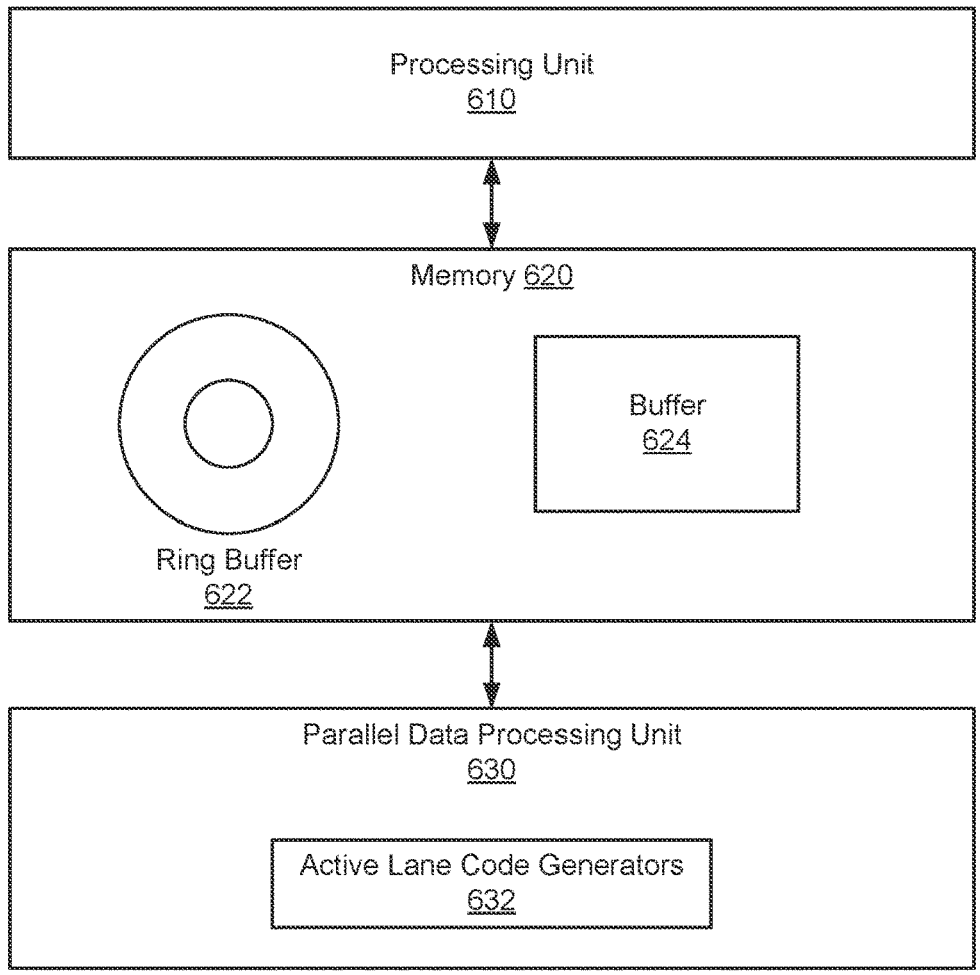
FIG. 6 is a generalized block diagram of a computing system.

Turning now to FIG. 6, a generalized block diagram is shown of a computing system 600. As shown, the computing system 600 includes a processing unit 610, a memory 620 and a parallel data processing unit 630. In some implementations, the functionality of the computing system 600 is included as components on a single die, such as a single integrated circuit. In other implementations, the functionality of the computing system 600 is included as multiple dies on a system-on-a-chip (SOC). In various implementations, the computing system 600 is used in a desktop, a portable computer, a mobile device, a server, a peripheral device, or other.

The circuitry of the processing unit 610 processes instructions of a predetermined algorithm. The processing includes fetching instructions and data, decoding instructions, executing instructions, and storing results. In one implementation, the processing unit 610 uses one or more processor cores with circuitry for executing instructions according to a predefined general-purpose instruction set architecture (ISA). In various implementations, the processing unit 610 is a general-purpose central processing unit (CPU). The parallel data processing unit 630 includes the circuitry and the functionality of the apparatus 100 (of FIG. 1), and the apparatus 400 (of FIG. 4).

In various implementations, threads are scheduled on one of the processing unit 610 and the parallel data processing unit 630 in a manner that each thread has the highest instruction throughput based at least in part on the runtime hardware resources of the processing unit 610 and the parallel data processing unit 630. In some implementations, some threads are associated with general-purpose algorithms, which are scheduled on the processing unit 610, while other threads are associated with parallel data computationally intensive algorithms such as video graphics rendering algorithms, which are scheduled on the parallel data processing unit 630.

Some threads, which are not video graphics rendering algorithms, still exhibit parallel data and intensive throughput. These threads have instructions which are capable of operating simultaneously with a relatively high number of different data elements. Examples of these threads are threads for scientific, medical, finance and encryption/decryption computations. These threads were traditionally scheduled on the processing unit 610. However, the high parallelism offered by the hardware of the parallel data processing unit 630 and used for simultaneously rendering multiple pixels, is capable of also simultaneously processing the multiple data elements of the scientific, medical, finance, encryption/decryption, and other computations. The parallel data processing unit 630 includes the active lane code generators 632 for reducing power consumption. In various implementations, the active lane code generators 632 include the functionality of the active lane code generators 122 and 152 (of FIG. 1) and active lane code generators 422 and 452 (of FIG. 4). Therefore, the compute resources of the parallel data processing unit 630 reduce power consumption by maintaining at least one or more lanes of multiple compute units as inactive while processing tasks, and yet still providing result data from each of the multiple lanes.

To change the scheduling of the above computations from the processing unit 610 to the parallel data processing unit 630, software development kits (SDKs) and application programming interfaces (APIs) were developed for use with widely available high-level languages to provide supported function calls. The function calls provide an abstraction layer of the parallel implementation details of the parallel data processing unit 630. The details are hardware specific to the parallel data processing unit 630 but hidden to the developer to allow for more flexible writing of software applications. The function calls in high level languages, such as C, C++, FORTRAN, and Java and so on, are translated to commands which are later processed by the hardware in the parallel data processing unit 630. Although a network interface is not shown, in some implementations, the parallel data processing unit 630 is used by remote programmers in a cloud computing environment.

A software application begins execution on the processing unit 610. Function calls within the application are translated to commands by a given API. The processing unit 610 sends the translated commands to the memory 620 for storage in the ring buffer 622. The commands are placed in groups referred to as command groups. In some implementations, the processing units 610 and 630 use a producer-consumer relationship, which is also be referred to as a client-server relationship. The processing unit 610 writes commands into the ring buffer 622. Then the parallel data processing unit 630 reads the commands from the ring buffer 622, processes the commands, and writes result data to the buffer 624. The processing unit 610 is configured to update a write pointer for the ring buffer 622 and provide a size for each command group. The parallel data processing unit 630 updates a read pointer for the ring buffer 622 and indicates the entry in the ring buffer 622 at which the next read operation will use.

Figure 7:
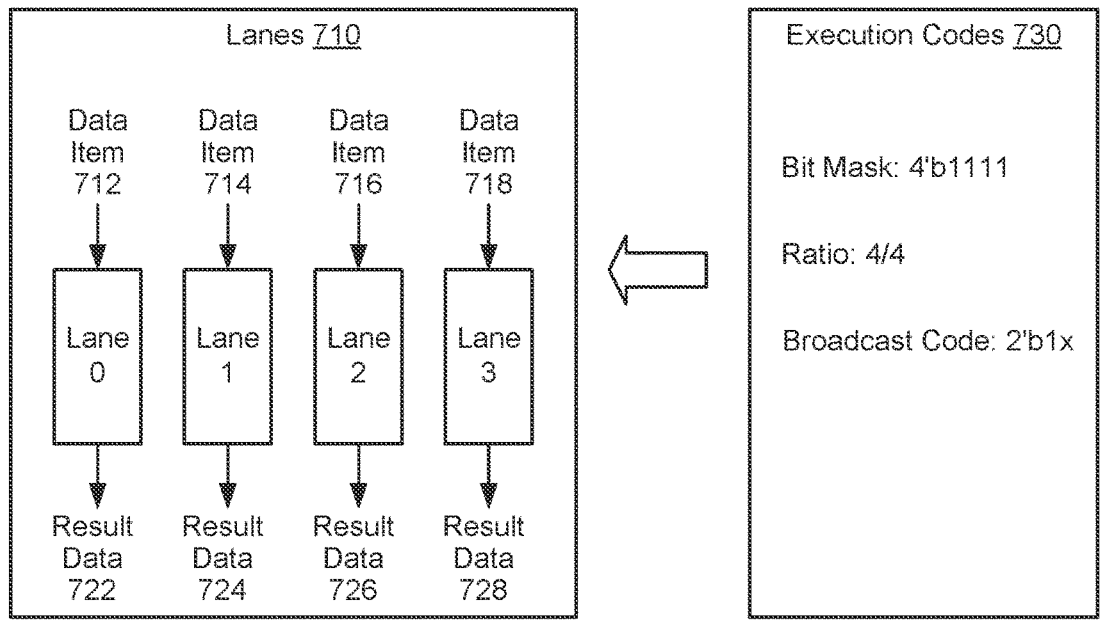
FIG. 7 is a generalized block diagram of parallel data compute resources that efficiently manage power consumption of multiple integrated circuits.
Figure 7:
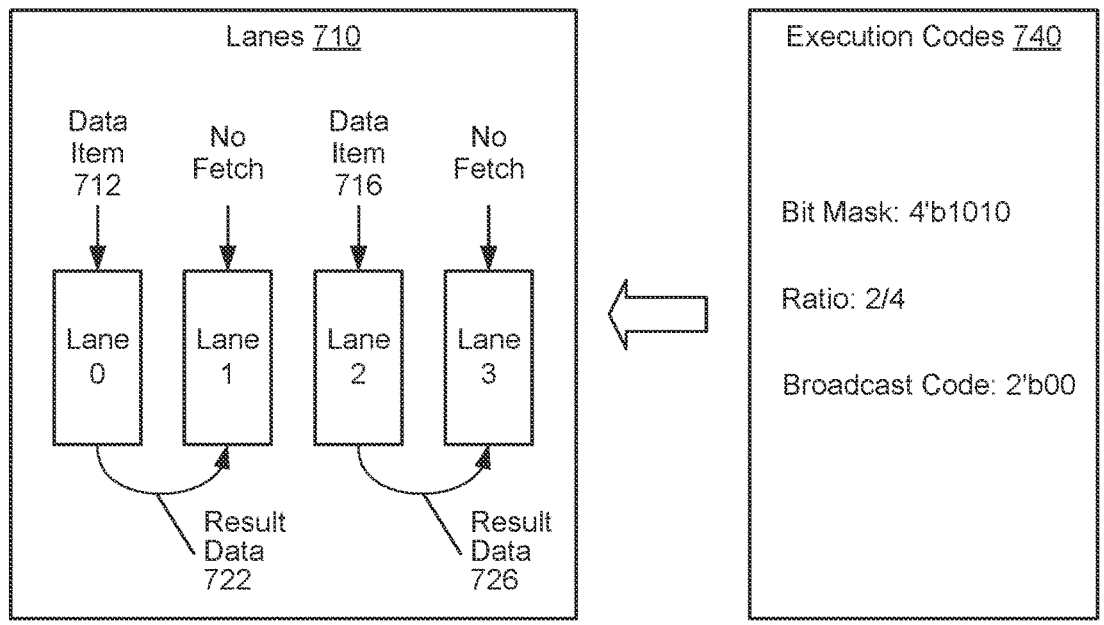

Turning now to FIG. 7, a generalized block diagram is shown of parallel data compute resources 700 that efficiently manage power consumption of multiple integrated circuits. The lanes 710 are representative of multiple lanes of a compute unit (not shown). Each lane of the lanes 710 is a SIMD lane capable of simultaneous execution in a lockstep manner of multiple work items of a wave front. In various implementations, the lanes 710 include the functionality of lanes 142 (of FIG. 1). Although four lanes are shown, the corresponding compute unit can include any number of lanes based on design requirements. For example, compute units can include 32 or 64 SIMD lanes in various implementations.

The lanes 710, numbered 0 to 3, are four of the total number of lanes of the compute unit. The "Lane 0" receives data item 712 and processes the data item 712 using one or more instructions that have been translated to commands executable by the compute unit. The "Lane 0" generates the result data 722. Similarly, the "Lane 1" receives the different data item 714 and generates the result data 724, the "Lane 2" receives the different data item 716 and generates the result data 726, and the "Lane 3" receives the different data item 718 and generates the result data 728. The lanes 710 perform these steps based on control signals generated by one of the examples of execution codes 730. As described earlier, a code generator generates an execution code as a bit mask, as a ratio, as a broadcast code, or other. The execution codes 730 (or codes 730) include three examples of a code that can be generated by a code generator to indicate how the lanes 710 process data items. It is noted that the code generator generates only a single code such as only one of the three examples being shown.

The 4-bit bit mask includes the value 1111. Here, the notation "4'b" indicates four binary values, and an asserted value uses the binary value '1' to indicate a lane of the lanes 710 should be active. Therefore, the bit mask value of "4'b 1111" indicates that each of the four lanes "Lane 0" to "Lane 3" should be active. Similar to the bit mask, the ratio value of "4/4" indicates four lanes should be active of a total number of four lanes. Therefore, the ratio value of "4/4" indicates that each of the four lanes "Lane 0" to "Lane 3" should be active. The broadcast code includes two bits with a first bit to indicate whether at least one lane of the multiple lanes is inactive and a second bit to indicate one of two ratios to use when at least one lane of the multiple lanes is inactive. Here, an asserted value uses the binary value '1' to indicate each lane of the multiple lanes are active. Since no lanes are inactive, the second bit has a Boolean "don't care" value indicated by "x." Therefore, the broadcast code value of "2'b1x" indicates that each of the four lanes "Lane 0" to "Lane 3" should be active.

Similar to the codes 730, the execution codes 740 (or codes 740) include three examples of a code that can be generated by a code generator to indicate how the lanes 710 process data items. It is noted that the code generator generates only a single code such as only one of the three examples being shown. The 4-bit bit mask of the codes 740 includes the value "4'b1010" where an asserted value uses the binary value '1' to indicate a lane of the lanes 710 should be active and a negated value uses the binary value '0' to indicate a lane of the lanes 710 should be inactive. In other implementations, the binary values for asserted and negated values are reversed. Therefore, bit positions of the asserted values of the bit mask value of "4'b1010" indicates that "Lane 0" and "Lane 2" should be active, whereas "Lane 1" and "Lane 3" should be inactive. Therefore, the "Lane 0" receives the data item 712, generates the result data 722, and forwards the result data 722 to the output stage of "Lane 1."

Each of "Lane 0" and "Lane 1" provides the result data 722 as output values. However, the compute unit did not fetch a data item for "Lane 1," and the compute unit performs clock gating and power gating for "Lane 1." Therefore, the compute unit reduces power consumption by maintaining "Lane 1" as inactive while processing tasks, and yet still provides result data, such as result data 722, for each of "Lane 0" and "Lane 1." Similarly, the "Lane 2" receives the data item 716, generates the result data 726, and forwards the result data 726 to the output stage of "Lane 3." Each of "Lane 2" and "Lane 3" provides the result data 726 as output values. However, the compute unit did not fetch a data item for "Lane 3," and the compute unit performs clock gating and power gating of "Lane 3." Therefore, the compute unit reduces power consumption by maintaining "Lane 3" as inactive while processing tasks, and yet still provides result data, such as result data 726, for each of "Lane 2" and "Lane 3."

Similar to the bit mask, the ratio value of "2/4" indicates two lanes should be active of a total number of four lanes. Therefore, the ratio value of "2/4" indicates that "Lane 0" and "Lane 2" are active, and "Lane 1" and "Lane 3" are inactive. The broadcast code includes two bits with a first bit to indicate whether at least one lane of the multiple lanes is inactive and a second bit to indicate one of two ratios to use when at least one lane of the multiple lanes is inactive. Here, a negated value uses the binary value '0' to indicate at least one lane is inactive. The second bit has a negated value that uses the binary '0' to indicate a pattern that defines which lanes are active and which lanes are inactive. Here, the second bit using the negated value indicates that "Lane 0" and "Lane 2" are active, and "Lane 1" and "Lane 3" are inactive. Therefore, the compute unit reduces power consumption by maintaining half of the multiple lanes as inactive while processing tasks, and yet still providing result data from each of the multiple lanes.

Figure 8:
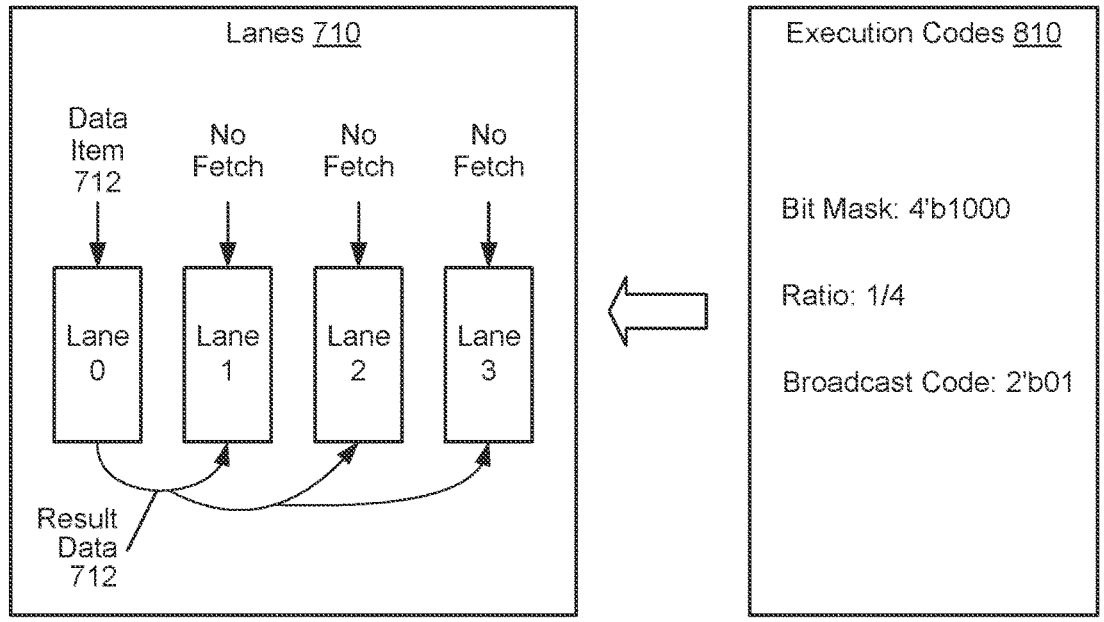
FIG. 8 is a generalized block diagram of parallel data compute resources that efficiently manage power consumption of multiple integrated circuits.
Figure 8:
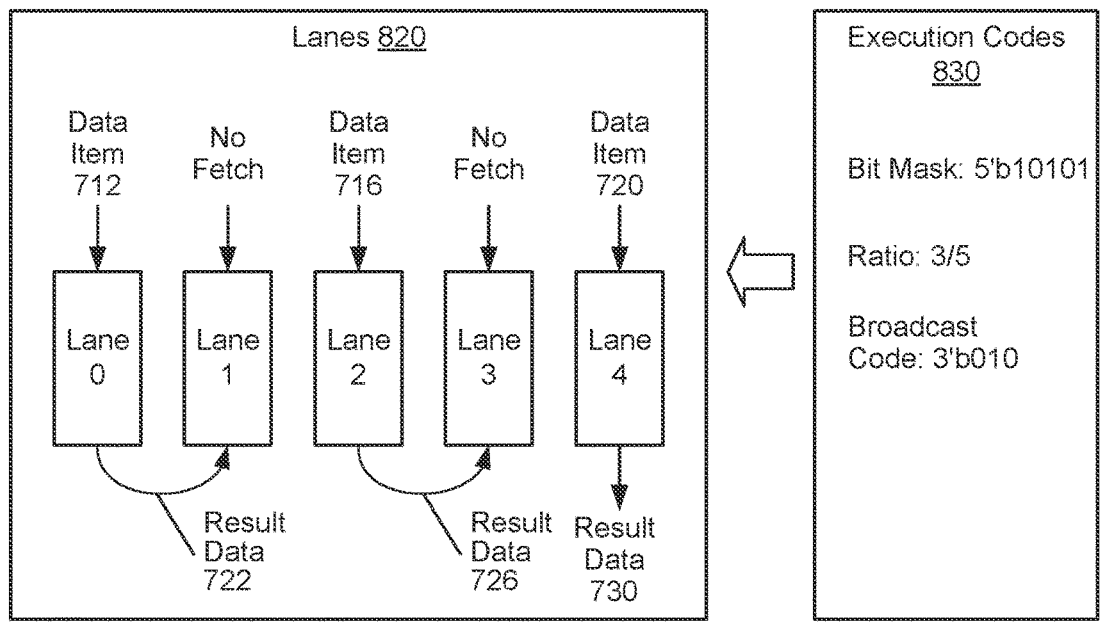

Referring to FIG. 8, a generalized block diagram is shown of parallel data compute resources 800 that efficiently manage power consumption of multiple integrated circuits. Circuitry described earlier are numbered identically. The lanes 710 are four of a total number of lanes of a compute unit such as lanes numbered 0 to 3. The lanes 710 processes tasks based on control signals generated by one of the examples of execution codes 810. The execution codes 810 (or codes 810) include three examples of a code that can be generated by a code generator to indicate how the lanes 710 process data items. It is noted that the code generator generates only a single code such as only one of the three examples being shown.

The 4-bit bit mask of the codes 810 includes the value "4'b1000" where an asserted value uses the binary value '1' to indicate a lane of the lanes 710 should be active and a negated value uses the binary value '0' to indicate a lane of the lanes 710 should be inactive. In other implementations, the binary values for asserted and negated values are reversed. Therefore, bit positions of the asserted values of the bit mask value of "4'b1000" indicates that "Lane 0" should be active, whereas "Lane 1," "Lane 2," and "Lane 3" should be inactive. Therefore, the "Lane 0" receives the data item 712, generates the result data 722, and forwards the result data 722 to the output stages of "Lane 1," "Lane 2," and "Lane 3." Each of the four lanes "Lane 0" to "Lane 3" provides the result data 722 as output values. However, the compute unit did not fetch data items for of "Lane 1," "Lane 2," and "Lane 3." The compute unit is also able to perform clock gating and power gating for "Lane 1," "Lane 2," and "Lane 3." Therefore, the compute unit reduces power consumption by maintaining "Lane 1," "Lane 2," and "Lane 3"

as inactive while processing tasks, and yet still provides result data, such as result data 722, for each of the four lanes "Lane 0" to "Lane 3."

Similar to the bit mask, the ratio value of "1/4" indicates one lane should be active of a total number of four lanes. Therefore, the ratio value of "1/4" indicates that "Lane 0" is active and "Lane 1," "Lane 2," and "Lane 3" are inactive. The broadcast code uses the same meanings of bit positions as the broadcast codes described for codes 730 and 740. Here, the second bit has an asserted value that uses the binary '1' to indicate a pattern that defines the "Lane 0" as active and "Lane 1," "Lane 2," and "Lane 3" as inactive. Therefore, the compute unit reduces power consumption by maintaining one quarter of the multiple lanes as active while processing tasks, and yet still provides result data from each of the multiple lanes.

The lanes 820 are five of a total number of lanes of a compute unit such as lanes numbered 0 to 4. The lanes 820 processes tasks based on control signals generated by one of the examples of execution codes 830. Bit positions of the asserted values of the 5-bit mask value of "5'b10101" indicates that "Lane 0," "Lane 2" and "Lane 4" should be active, whereas "Lane 1" and "Lane 3" should be inactive. Therefore, the "Lane 0" receives the data item 712, generates the result data 722, and forwards the result data 722 to the output stage of "Lane 1." Similarly, the "Lane 2" receives the data item 716, generates the result data 726, and forwards the result data 726 to the output stage of "Lane 3." The "Lane 4" receives the data item 720, and generates the result data 730 as an output value. The compute unit does not fetch data for "Lane 1" and "Lane 3, and the compute unit also performs clock gating and power gating for "Lane 1" and "Lane 3."

Similar to the bit mask, the ratio value of "3/5" indicates three lanes should be active of a total number of five lanes, and the assigned active lanes are the same as described for the 5-bit bit mask. The broadcast code uses the same meanings of bit positions as the broadcast codes described for codes 730, 740 and 810. However, here, the broadcast code uses 3 bits, and has the value "3'b010" with 2 bits for identifying a pattern that indicates which lanes are assigned as being active. These two bits have the value "2'b10" and the assigned active lanes are the same as described for the 5-bit bit mask and the ratio. It is noted that in other implementations, other indications and other assignments of active lanes are possible and contemplated that are different from the examples shown for execution codes 730 and 740 (of FIG. 7) and execution codes 810 and 830. However, regardless of the selected format of the indications and assignments, the compute unit is still able to reduce power consumption by maintaining less than a total number of the multiple lanes as active while processing tasks, and yet still provides result data from each of the multiple lanes.

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases, the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
at least one compute unit comprising:
a plurality of lanes, each configured to perform processing associated with a task; and
circuitry configured to:
receive data that includes a first indication of first portions of the task that are to be processed and second portions of the task that are to be skipped;
perform processing using at least one lane identified as active, wherein the first indication is usable to control whether individual lanes of the plurality of lanes are to be active or inactive and cause a fetch of data for active lanes while skipping fetch of data for inactive lanes; and
provide a result from the at least one lane identified as active to at least one inactive lane, wherein the inactive lane receives the result without the second portions of the task having been processed by any of the plurality of lanes.

2. The processor as recited in claim 1, wherein the circuitry is further configured to perform power gating for the one or more lanes of the plurality of lanes, based at least in part on the data that includes the first indication.

3. The processor as recited in claim 1, wherein the first indication has been generated based at least in part on one or more characteristics of source data of the task.

4. The processor as recited in claim 1, wherein the circuitry is further configured to generate the data that includes the first indication as a ratio indicating a number of active lanes to a number of total lanes of the plurality of lanes.

5. The processor as recited in claim 1, wherein the circuitry is further configured to:
receive an indication of a power domain from a power controller, wherein the power domain comprises one or more of an operating power supply voltage for the processor and an operating clock frequency for the processor; and
generate the data that includes the first indication, based at least in part on the indication of the power domain.

6. The processor as recited in claim 1, wherein the circuitry is further configured to generate the data that includes the first indication based on data items corresponding to pixels of a region of a frame with a resolution or color accuracy below a threshold.

7. The processor as recited in claim 6, wherein the circuitry is further configured to generate data that includes a second indication of which portions of the task are to be processed and which portions are to be skipped, wherein the second indication is based at least in part on the first indication.

8. A method, comprising:
processing tasks, by a parallel data processor comprising at least one compute unit with a plurality of lanes comprising circuitry configured to process a task comprising a plurality of threads;
generating, by the parallel data processor, data that includes a first indication of first portions of the task that are to be processed and second portions of the task that are to be skipped;
processing, by the parallel data processor, the task using at least one lane identified as active, wherein the first indication is usable to control whether individual lanes of the plurality of lanes are to be active or inactive and cause a fetch of data for active lanes while skipping fetch of data for inactive lanes; and
providing, by the parallel data processor, a result from the at least one lane identified as active to at least one inactive lane, wherein the inactive lane receives the result without the second portions of the task having been processed by any of the plurality of lanes.

9. The method as recited in claim 8, further comprising performing, by the parallel data processor, power gating for the one or more lanes of the plurality of lanes, based at least in part on the data that includes the first indication.

10. The method as recited in claim 8, wherein the first indication has been generated based at least in part on one or more characteristics of source data of the task.

11. The method as recited in claim 8, further comprising generating the data that includes the first indication as a ratio indicating a number of active lanes of to a number of total lanes of the plurality of lanes.

12. The method as recited in claim 8, further comprising:
receiving, by the parallel data processor, an indication of a power domain from a power controller, wherein the power domain comprises one or more of an operating power supply voltage for the parallel data processor and an operating clock frequency for the parallel data processor; and
generating, by the parallel data processor, the data that includes the first indication based at least in part on the indication of the power domain.

13. The method as recited in claim 8, further comprising generating, by the parallel data processor, the data that includes the first indication based on data items of the plurality of threads corresponding to pixels of a region of a frame with a resolution or color accuracy below a threshold.

14. The method as recited in claim 13, further comprising generating, by the parallel data processor, data that includes a second indication of which portions of the task are to be processed and which portions are to be skipped, wherein the second indication is based at least in part on the first indication.

15. A computing system comprising:
a memory configured to store data to be processed during execution of a task;
a parallel data processor comprising:
at least one compute unit with a plurality of lanes comprising circuitry configured to process the task comprising a plurality of threads;
a code generator configured to generate data that includes a first indication of first portions of the task that are to be processed and second portions of the task that are to be skipped; and
circuitry configured to:
receive the data that includes the first indication;
process the task using at least one lane identified as active, wherein the first indication is usable to control whether individual lanes of the plurality of lanes are to be active or inactive and cause a fetch of data for active lanes while skipping fetch of data for inactive lanes; and
provide a result from the at least one lane identified as active to at least one inactive lane, wherein the inactive lane receives the result without the second portions of the task having been processed by any of the plurality of lanes.

16. The computing system as recited in claim 15, wherein the circuitry is further configured to perform power gating for the one or more lanes of the plurality of lanes, based at least in part on the data that includes the first indication.

17. The computing system as recited in claim 15, wherein the first indication has been generated based at least in part on one or more characteristics of source data of the task.

18. The computing system as recited in claim 15, wherein the circuitry is further configured to generate the data that includes the first indication as a ratio indicating a number of active lanes of to a number of total lanes of the plurality of lanes.

19. The computing system as recited in claim 15, further comprising a power controller, wherein the code generator is further configured to:
receive an indication of a power domain from the power controller, wherein the power domain comprises one or more of an operating power supply voltage for the parallel data processor and an operating clock frequency for parallel data the processor; and
generate the data that includes the first indication based at least in part on the indication of the power domain.

20. The computing system as recited in claim 15, wherein the code generator is further configured to generate the data that includes the first indication based on data items of the plurality of threads corresponding to pixels of a region of a frame with a resolution or color accuracy below a threshold.

* * * * *